July 4, 1950     H. W. KRANZ     2,513,496
SCUFF BAR FOR BICYCLES
Filed Jan. 3, 1950
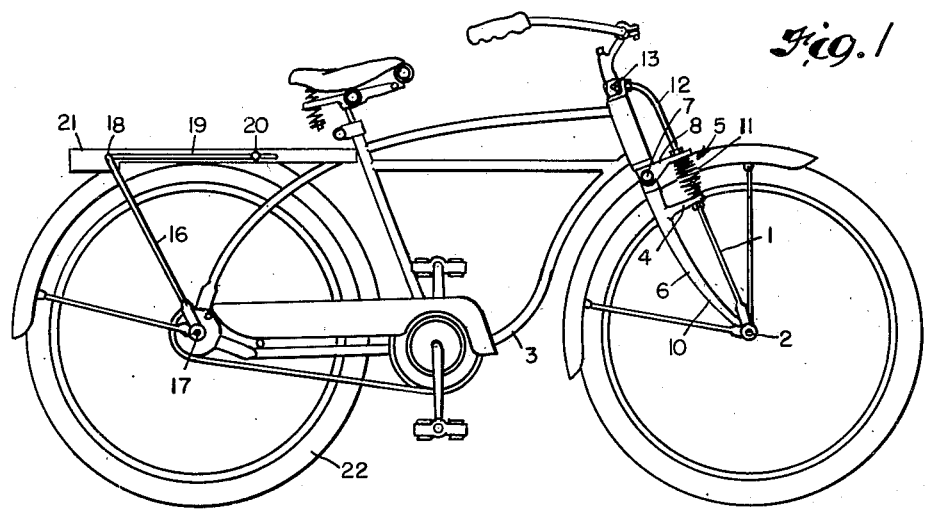
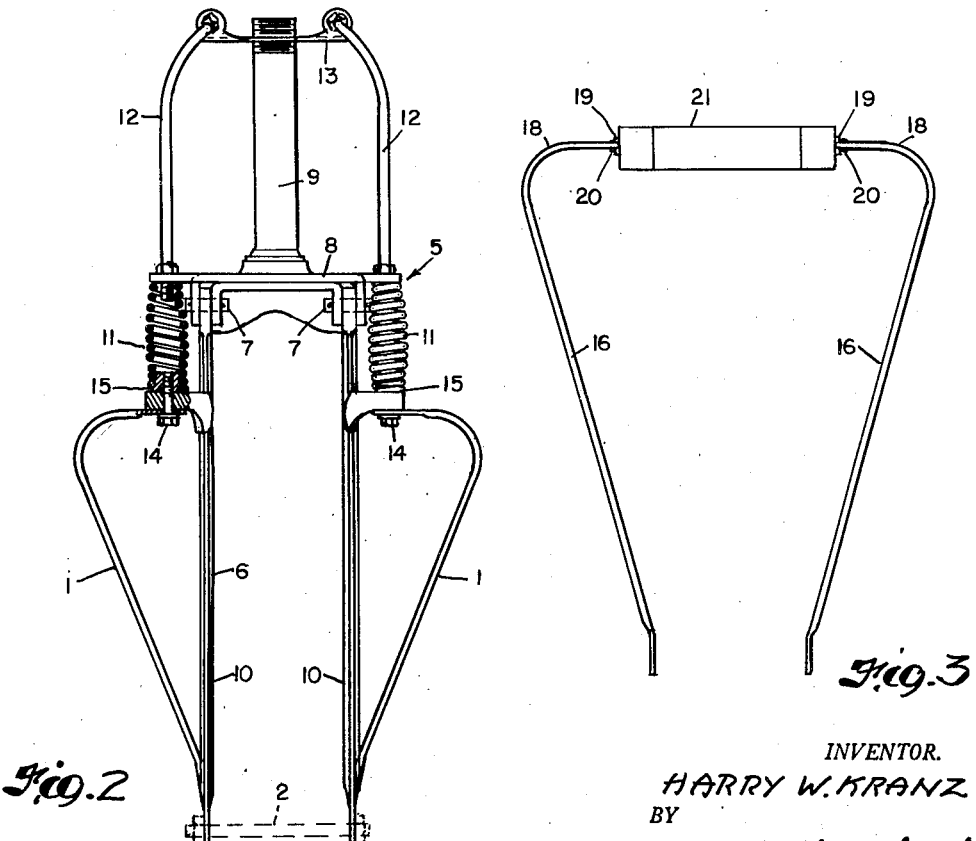
INVENTOR.
HARRY W. KRANZ
BY
Oberlin + Limbach
ATTORNEYS.

Patented July 4, 1950

2,513,496

UNITED STATES PATENT OFFICE 2,513,496

SCUFF BAR FOR BICYCLES

Harry W. Kranz, Lakewood, Ohio, assignor to The Cleveland Welding Company, Cleveland, Ohio, a corporation of Ohio Application January 3, 1950, Serial No. 136,562

7 Claims. (Cl. 280—289)

The present invention relates generally as indicated to scuff bars for bicycles and has for one of its main objects the provision of scuff bars which extend laterally of the plane of the bicycle frame on opposite sides at the front and rear portions of the bicycle for the purpose of protecting the bicycle from being marred or otherwise damaged when it is leaned against a wall or like supporting surface or when it falls or otherwise lies on its side on the ground or pavement and of reducing the possibility of serious injury to the rider in the event that the bicycle skids along its side or travels too close to a low fence or wall or the like.

Another object of this invention is to provide two pairs of scuff bars, one pair at the front portion of the bicycle and the other pair at the rear portion, the scuff bars at the front portion being so disposed as to impart added resilience to the spring fork of the bicycle to which the upper ends of the bars are adapted to be secured and said bars at the rear portion being so disposed as to provide a sturdy support for the luggage carrier of the bicycle and to additionally serve as convenient anchorage means for firmly securing objects being carried on the luggage carrier.

Other objects and advantages will become apparent as the following description proceeds.

To the accomplishment of the foregoing and related ends, said invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In said annexed drawing:

Fig. 1 is a side elevation view of a bicycle having mounted thereon the scuff bars constituting the present invention;

Fig. 2 is a front elevation view of the scuff bars which are disposed at the front portion of the bicycle and connected to the spring fork of the bicycle; and Fig. 3 is a rear elevation view of the scuff bars which are disposed at the rear portion of the bicycle and connected to the luggage carrier of the bicycle.

Referring now more particularly to the drawing and first to the scuff bars disposed at the front portion of the bicycle, these preferably comprise a pair of bars 1, 1 secured at their lower ends to the opposite ends of the front wheel axle 2, said bars extending upwardly and laterally of the plane of the bicycle frame 3 with the upper ends bent inward and connected to the projections 4, 4 of the spring fork assembly 5.

As shown and as more particularly described in my copending application Serial No. 2,889, filed January 17, 1948, said spring fork assembly 5 comprises a fork member 6 pivotally connected as by means of the transverse pins 7, 7 to the laterally projecting member 8 which is secured to the lower end of the tubular member 9, said fork member 6 being provided with a pair of downwardly extending legs 10, 10 which have their lower ends also connected to the opposite ends of the front wheel axle 2. Interposed between the projections 4, 4 of the respective fork legs 10, 10 and said laterally projecting member are a pair of coil springs 11, 11 which, as apparent, resiliently oppose pivotal movement of said fork 6 with respect to the assembly comprising tubular member 9 and laterally projecting member 8 about the pins 7, 7. Truss rods 12, 12 provide additional support for the laterally projecting member 8 and extend upwardly with their upper ends connected to a crosspiece 13 at the upper end of said tubular member 9.

It is to be noted that because said scuff bars 1, 1 are bent inward as shown and secured to the respective projections 4, 4 as by bolts 14, 14 threaded into the projections, there will be a yielding of said bars at such bends to thus provide added resiliency in the fork assembly 5 in the nature of a resilient reinforcement of the portions of the legs 10, 10 which extend downwardly from projections 4, 4.

Threaded onto the upper ends of bolts 14, 14 are nuts, 15, 15 which bear against the bottom ends of springs 11, 11 whereby said nuts may be rotated to adjust the compression of said springs.

Said scuff bars, 1, 1, because they project laterally of the plane of the bicycle frame 3, will protect the sides of the bicycle at the front end thereof from damage as previously indicated.

The scuff bars at the opposite sides of the rear portion of the bicycle comprise a pair of bars 16, 16 having their lower ends secured on opposite ends of the rear wheel axle 17, said bars extending upwardly and laterally of the plane of the bicycle preferably in a manner similar to the scuff bars 1, 1 at the front portion of the bicycle. However, in this case the upper ends of the bars are bent in two places to provide inwardly extending portions 18, 18 and forwardly extending portions 19, 19, the latter portions being generally parallel to each other and secured as by the bolts 20, 20 to the opposite sides of the luggage carrier 21 of the bicycle. Thus said rear scuff bars 16, 16 function not only in the same manner as the scuff bars 1, 1 at the front portion of the bicycle with reference to the protection afforded thereby to the sides of the rear portion of the bicycle from damage, but in addition serve to support objects which overhang the carrier to thus keep such objects away from the spokes of the rear wheel 22 and furthermore the inwardly extending portions 18, 18 serve as convenient anchors for securely fastening objects onto said luggage carrier 21 as with ropes or tapes.

Taken together, the two pairs of scuff bars 1, 1 and 16, 16 adequately protect the bicycle from damage as aforesaid and in addition the rider is protected from possible serious injury as when the bicycle is out of control and skids on its side or when the bicycle travels too close to low fences and the like.

It is further to be noted that the scuff bars 1, 1 and 16, 16 incline upwardly and outwardly from the lower points of attachment which are disposed within the peripheries of the respective wheels to points adjacent the peripheries of the respective wheels and outwardly of the upper points of attachment, said bars each being bent inwardly at their upper ends to extend to the upper points of attachment. In the embodiment of the invention illustrated, such upper points of attachment are the front wheel fork assembly 6 and the luggage carrier 21. The points to which said bars 1, 1 and 16, 16 incline upwardly and outwardly are disposed outwardly beyond the ends of the respective wheel axles 2 and 17 as well as outwardly of the fork assembly 6 and the luggage carrier 21 whereby to define with the foot pedals of the bicycle a three-point support for the bicycle when it rests on either side.

Other modes of applying the principle of the invention may be employed, change being made as regards the details described, provided the features stated in any of the following claims or the equivalent of such be employed.

I therefore particularly point out and distinctly claim as my invention:

1. Scuff bars for a bicycle of the type having a luggage carrier connected to the frame and extending rearwardly above the rear wheel thereof comprising a pair of bars adapted to be secured at their lower ends to the opposite ends of the rear wheel axle of such bicycle, said bars when thus secured inclining upwardly and laterally of opposite sides of the plane of the bicycle to points laterally beyond such luggage carrier and beyond the ends of such axle and having upper ends bent inwardly and longitudinally of the bicycle and adapted to be secured to the opposite sides of such luggage carrier.

2. Scuff bars for a bicycle of the type having foot pedals and a front wheel fork assembly comprising two bars each adapted to be secured at their ends to vertically spaced points on one side of the bicycle, the lower one of such points of attachment of each bar to the bicycle being disposed within the periphery of the front and rear wheels respectively of the bicycle and the upper one of such points of attachment of each bar to the bicycle being disposed adjacent the periphery of the front and rear wheels respectively of the bicycle, said bars when thus secured to the bicycle each inclining upwardly and laterally outwardly of the plane of the bicycle from the lower point of attachment to a point adjacent its upper end disposed outward of the respective wheel axle end and the upper point of attachment, and each bar being bent inwardly at its upper end to such upper point of attachment, such points to which said bars incline upwardly and outwardly together with the foot pedal on the same side of the bicycle as said bars constituting a three-point support for the bicycle when the latter rests on the side on which said bars are disposed.

3. Scuff bars for a bicycle of the type having foot pedals and a front wheel fork assembly and a luggage carrier connected to the frame and extending rearwardly above the rear wheel comprising two bars each adapted to be secured at their ends to vertically spaced points on one side of the bicycle, the lower one of such points of attachment of each bar to the bicycle being disposed within the periphery of the front and rear wheels respectively of the bicycle and the upper one of such points of attachment of each bar to the bicycle being disposed adjacent the periphery of the front and rear wheels respectively of the bicycle, said bars when thus secured to the bicycle each inclining upwardly and laterally outwardly of the plane of the bicycle from the lower point of attachment to a point adjacent its upper end disposed outward of the respective wheel axle end and the upper point of attachment, and each bar being bent inwardly at its upper end to such upper point of attachment, such points to which said bars incline upwardly and outwardly together with the foot pedal on the same side of the bicycle as said bars constituting a three-point support for the bicycle when the latter rests on the side on which said bars are disposed, the upper point of attachment of the bar which has its lower point of attachment within the periphery of the rear wheel of the bicycle being on one side of the luggage carrier.

4. Scuff bars for a bicycle of the type having foot pedals and a front wheel fork assembly and a luggage carrier connected to the frame and extending above the rear wheel comprising two pairs of bars adapted to be respectively secured at their lower ends to the opposite ends of the front and rear wheel axles of such bicycle, each pair of said bars when thus secured diverging upwardly and outwardly of the opposite sides of the plane of the bicycle to points outwardly beyond the ends of the respective axle and outwardly of opposite sides of the fork assembly and luggage carrier respectively and having inwardly bent upper ends, the upper ends of the pair of bars at the front of the bicycle being adapted to be secured to such front wheel fork assembly of the bicycle, and the upper ends of the other pair of bars being adapted to be secured on opposite sides of such luggage carrier, such points to which said bars diverge upwardly and outwardly together with the foot pedals of the bicycle constituting three-point supports for the bicycle when the latter rests on either side.

5. Scuff bars for a bicycle of the type having foot pedals and a front wheel fork assembly comprising two bars each adapted to be secured at their ends to vertically spaced points on one side of the bicycle, the lower one of such points of attachment of each bar to the bicycle being disposed within the periphery of the front and rear wheel respectively of the bicycle and the upper one of such points of attachment of each bar to the bicycle being disposed adjacent the periphery of the front and rear wheels respectively of the bicycle, said bars when thus secured to the bicycle each inclining upwardly and laterally outwardly of the plane of the bicycle from the lower point of attachment to a point adjacent its upper end disposed outward of the respective wheel axle end and the upper point of attachment, and each bar being bent inwardly at its upper end to such upper point of attachment, such points to which said bars incline upwardly and outwardly together with the foot pedal on the same side of the bicycle as said bars constituting a three-point support for the bicycle when the latter rests on the side on which said bars are disposed, at least one of said bars having an upper end which extends longitudinally of the bicycle and adapted to be secured to the bicycle.

6. A scuff bar for a bicycle of the type having a luggage carrier connected to the frame and extending rearwardly above the rear wheel thereof, said scuff bar being adapted to be secured at its lower end to the bicycle at a point within the periphery of the rear wheel of the bicycle, said bar when thus secured inclining upwardly and outwardly of the plane of the bicycle to a point outwardly beyond the end of the rear wheel axle on such one side of the bicycle and opposite the corresponding side of the luggage carrier, said bar having an inwardly bent and forwardly bent upper end adapted to be secured to such one side of the luggage carrier.

7. A scuff bar for a bicycle of the type having a luggage carrier connected to the frame and extending rearwardly above the rear wheel thereof, said scuff bar being adapted to be secured at its lower end to the bicycle at a point within the periphery of the rear wheel of the bicycle, said bar when thus secured inclining upwardly and outwardly of the plane of the bicycle to a point outwardly beyond the end of the rear wheel axle on such one side of the bicycle and opposite the corresponding side of the luggage carrier, said bar having an upper end bent inwardly and thence longitudinally of the bicycle and adapted to be secured to such one side of the luggage carrier.

HARRY W. KRANZ.

REFERENCES CITED

The following references are of record in the file of this patent:

UNITED STATES PATENTS

| Number | Name | Date |
| --- | --- | --- |
| 620,651 | Heineke | Mar. 7, 1889 |
| 984,787 | Wall | Feb. 21, 1911 |
| 2,126,752 | Devine et al. | Aug. 16, 1938 |
| 2,188,968 | Uber | Feb. 6, 1940 |

FOREIGN PATENTS

| Number | Country | Date |
| --- | --- | --- |
| 869,195 | France | Oct. 29, 1941 |